United States Patent Office 3,197,482
Patented July 27, 1965

3,197,482
SULFOLANYLALKYLAMINES
Herman E. Faith, Indianapolis, Ind., assignor to The Dow Chemical Company, Midland, Mich., a corporation of Delaware
No Drawing. Filed Sept. 10, 1962, Ser. No. 222,629
9 Claims. (Cl. 260—332.1)

The invention relates to novel organic compounds and more particularly relates to primary, secondary and tertiary alkylamines having a 3-sulfolanyl group as a substituent on an alkyl group attached to the amino nitrogen. The 3-sulfolanyl group is illustrated as follows:

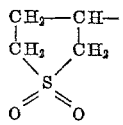

The present compounds may be represented by the following structural formula:

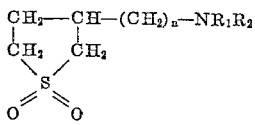

wherein $n=1$, 2 or 3
$R_1$=H or alkyl group having 1 to 3 carbon atoms
$R_2$=H or alkyl group having 1 to 3 carbon atoms The present invention also includes the hydrohalide salts of the foregoing compounds as well as the methohalide and ethohalide salts of the compounds wherein $R_1$ and $R_2$ are both alkyl groups.

The present compounds are crystalline solids. In free base form they are soluble in organic solvents such as ether, carbon tetrachloride and chloroform, but have limited solubility in water. In the form of the hydrohalide or methohalide salts, these compounds are relatively soluble in water, and have some solubility in some of the more polar organic solvents.

The compounds are adapted to be employed as active toxicants in compositions for the control of intestinal parasites in warm blooded animals, especially the helminths which invade the intestinal tract. Usually, the compounds are employed in the form of the hydrohalide or methohalide salts which have greater water solubility.

The compounds of the invention may be prepared in various ways as desired. For example, α-(3-sulfolanyl)-β-haloethane may be reacted at room temperature with a large excess, e.g., 60–70 equivalents, of ammonia or appropriate primary amine, and in the presence of ethanol for an extended period such as a week. The resulting hydrohalide may be recovered as by distillation of the excess amine. If desired, the hydrohalide may be converted to the free base and then to any other hydrohalide.

The α-(3-sulfolanyl)-β-haloethane may be prepared from ethyl 3-sulfolanylacetate by a Bouveault-Blanc reduction in which the ester is refluxed in absolute ethanol in the presence of sodium for two hours, and then the resulting alcohol, β-(3-sulfolanyl)ethanol, is reacted with a phosphorous trihalide, e.g. PBr₃, in chloroform medium for two hours at a temperature of 60° C. to obtain β-(3-sulfolanyl)ethyl halide.

Ethyl 3-sulfolanylacetate is obtained according to methods described in my copending application entitled "Sulfolanylalkanoic Acids and Esters Thereof." According to the copending application, diethyl malonate is reacted with 3-sulfolanyl bromide to add the sulfoanyl group to the α-carbon of the malonic ester. The malonic ester is then hydrolyzed and decarboxylated to obtain the α-substituted acetic acid, which is esterified.

Alternatively, the present amines may be obtained by the reduction of the appropriate carbonitrile. In yet another manner of preparing the amines, one of the amines prepared as described above may be alkylated according to known methods.

In general, the hydrohalide, methohalide and ethohalide addition salts of the present amines may be prepared by the addition of the requisite hydrogen halide, methyl halide or ethyl halide to an ether solution of the base.

The following examples serve to illustrate the invention and are not to be construed as limiting.

Example 1

α-(3-sulfolanyl)-β-bromoethane was allowed to stand with about 70 equivalents of ammonia in ethanol medium for one week. The excess ammonia was removed under reduced pressure. The hydrobromide so recovered was converted to the free base by the addition of 10 percent sodium hydroxide solution to an aqueous solution. The free base was taken up in ether by an ether extraction and converted to the hydrochloride by the addition of hydrogen chloride to the ether solution. The resulting β-(3-sulfolanyl)ethylamine hydrochloride exhibited a melting range of 180–182° C. and was obtained in 87 percent yield.

Example 2

In a manner similar to Example 1, α-(3-sulfolanyl)-β-bromoethane was allowed to stand with about 70 equivalents of methylamine. The N-methyl-β-(3-sulfolanyl)-ethylamine hydrochloride obtained in this preparation exhibited a melting range of 151–152.5° C. and was obtained in a yield of 70 percent.

Example 3

In a manner similar to that described in Example 1, α-(3-sulfolanyl)-β-bromoethane was reacted with isopropylamine. The N-isopropyl-β-(3-sulfolanyl)ethylamine hydrobromide recovered exhibited a melting range of 166–167° C. and was obtained in 92 percent yield.

Example 4

The β-bromoethyl compound described in Example 1 in the amount of 20 grams (0.088 mole) was heated at 65° C. with 45 milliliters of diethylamine in anhydrous benzene medium for 28 hours. The reaction mixture was allowed to cool and diethylamine hydrobromide was filtered off. The filtrate was then concentrated in vacuo. The so-obtained base was taken up in anhydrous ether. The ether solution was filtered and treated with hydrogen chloride to obtain the hydrochloride salt. The hydrochloride salt was recrystallized from anhydrous ethyl acetate. The so-purified N,N-diethyl-β-(3-sulfolanyl)ethylamine hydrochloride salt exhibited a melting range of 112°–113° C. and was obtained at 68 percent yield.

The corresponding ethoiodide salt was obtained by recovering free base from a portion of the said filtered ether solution and reaction of the base with ethyl iodide in dry benzene for 5 days at 25° C. The crystalline ethoiodide salt was recrystallized from warm ethanol. The so-purified salt exhibited a melting range of 213°–215° C. and was obtained in 52 percent yield.

Other tertiary amines of the invention are prepared in a similar manner to the foregoing example using the requisite sulfolanyl substituted alkyl halide and the desired secondary amine.

Example 5

Ten grams (0.0688 mole) of 3-sulfolanyl carbonitrile in 120 milliliters of acetic anhydride was reductively acetylated in a Paar hydrogenator at 25° C. in the presence of 0.2 gram of Adams catalyst and 2 grams of 8 percent palladium chloride on carbon. After 11 hours, the acetic anhydride was removed in vacuo, the residue warmed with ethanol, chilled and filtered from 0.7 gram of starting nitrile. Ethanol was then distilled from the filtrate leaving a syrup which was refluxed for 2.7 hours with 32 milliliters of 20 percent hydrochloric acid. Concentration of the solution yielded the 3-sulfolanylmethylamine hydrochloride salt. The hydrochloride salt exhibited a melting range of 238°–239° C. and was obtained at a yield of 78 percent.

*Example 6*

The base prepared as in Example 5 by the removal of ethanol from the filtrate was methylated by refluxing a solution of the base (0.065 mole) with 6.9 grams of benzaldehyde in 9 milliliters of ethanol for 45 minutes. Ethanol was removed under reduced pressure and the resulting Schiff's base was heated with 4.45 milliliters of methyl iodide in a sealed tube for 5.5 hours. This product was dissolved in 45 milliliters of methanol and 8 milliliters of water and refluxed for 30 minutes. Water (50 ml.) was added and the mixture was boiled to remove benzaldehyde. The base was extracted with chloroform and treated with hydrogen chloride. The resulting N-methyl-3-sulfolanylmethylamine hydrochloride exhibited a melting range of 154°–155° C. after recrystallization from absolute ethanol and was obtained in 63 percent yield.

*Example 7*

Ethyl acetoacetate was reacted with 3-bromosulfolane by heating the reactants together in the presence of sodium ethoxide at reflux temperature in anhydrous alcohol solvent medium for 1 hour. 112.5 grams (0.452 mole) of the resulting ethyl α-acetyl-3-sulfolanylacetate was added with cooling to 628 milliliters of 5 percent sodium hydroxide (0.785 mole) and stirred for 5.5 hours at 25° C. Decarboxylation was accomplished by adding 50 percent sulfuric acid to the solution at 45–50° C. over a 30-minute period and by continuing the warming and stirring at pH 3–4 for 45 minutes. The decarboxylation mixture was heated to remove 270 milliliters of water under reduced pressure. Then 38 grams of hydroxylamine hydrochloride and 48 grams of sodium acetate were added to the remaining reaction mixture and held at room temperature for 48 hours. A yield of crystals of 1-(3-sulfolanyl)-2-propanone oxime was obtained. The oxime in the amount of 7.44 grams (0.0388 mole) was reduced in 200 milliliters of pure absolute ethanol by the addition of 238 grams of 3 percent sodium amalgam over a period of 1.75 hours. A total of 21 milliliters of glacial acetic acid was added in portions during the reaction to keep the reaction mixture slightly acidic. The alcohol was removed under reduced pressure and the residual amine was taken up by chloroform extraction. The hydrochloride salt was precipitated from the chloroform solution by the addition of hydrogen chloride. The so-obtained α-methyl-3-sulfolanylethylamine hydrochloride exhibited a melting range of 192°–194° C. and was obtained in 57 percent yield. Free base obtained from the hydrochloride salt distilled at 163° C. under 3 millimeters of mercury pressure.

In administering a compound of the invention as an active toxicant for the control of helminths, the compound may be administered in a number of ways, e.g., in daily dosage amounts in gelatin capsules, or the compound may be incorporated in the drinking water, or the feed diet of the animal. Feed compositions are generally prepared to contain from about 0.01 to 1 percent by weight of one of the present compounds.

In representative operations, mice naturally infested with tapeworms were fed a diet containing one of the compounds of the invention at a concentration of 0.06 percent by weight. Use of each of β-(3-sulfolanyl)ethylamine hydrochloride, N-isopropyl-β-(3-sulfolanyl)ethylamine hydrobromide, and N-methyl-3-sulfolanylmethylamine hydrochloride resulted in complete clearance of tapeworms as shown by necropsy at the end of a one-week test period.

In further operations, mice naturally infested with tapeworms and/or pinworms were fed a diet containing α-methyl-3-sulfolanylethylamine hydrochloride at a level of 0.06 percent by weight for one day. Then the mice were inoculated with Ascaris ova and the test diet was continued 6 more days. Necropsy at the end of the test period showed that a large proportion of the Ascaris ova had been cleared.

I claim:

1. A sulfolanylalkylamine compound selected from the class consisting of: compounds having the structural formula

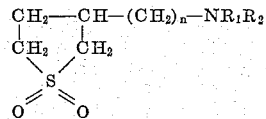

wherein $n$ is a number selected from the group consisting of 1, 2 and 3, $R_1$ is selected from the group consisting of hydrogen and alkyl having 1–3 carbon atoms and $R_2$ is selected from the group consisting of hydrogen and alkyl having 1–3 carbon atoms; hydrohalide salts thereof; and methohalide and ethohalide salts thereof wherein $R_1$ and $R_2$ are both alkyls having 1–3 carbon atoms.

2. A compound selected from the class consisting of N,N-diethyl-β-(3-sulfolanyl)ethylamine and the hydrohalide, methohalide and ethohalide salts thereof.

3. A compound selected from the class consisting of β-(3-sulfolanyl)ethylamine and the hydrohalide salts thereof.

4. A compound selected from the class consisting of N-methyl-3-sulfolanylmethylamine and the hydrohalide salts thereof.

5. N,N-diethyl-β-(3-sulfolanyl)ethylamine.

6. β-(3-sulfolanyl)ethylamine.

7. N-methyl-3-sulfolanylmethylamine.

8. N-alkyl-3-sulfolanylmethylamine, wherein said alkyl contains 1–3 carbon atoms.

9. N-alkyl-3-sulfolanylethylamine, wherein said alkyl contains 1–3 carbon atoms.

References Cited by the Examiner

UNITED STATES PATENTS

| | | | |
|---|---|---|---|
| 2,291,798 | 8/42 | Delfs | 260—332.1 |
| 2,439,345 | 4/48 | Morris | 260—332.1 |
| 2,461,341 | 2/49 | Morris et al. | 260—332.1 |
| 3,041,352 | 6/62 | Newey | 260—332.1 |

IRVING MARCUS, *Primary Examiner.*

DUVAL T. McCUTCHEN, *Examiner.*